US012207042B2

(12) United States Patent
Jiang et al.

(10) Patent No.: US 12,207,042 B2
(45) Date of Patent: Jan. 21, 2025

(54) LOUDSPEAKER AND ELECTRONIC DEVICE

(71) Applicant: VIVO MOBILE COMMUNICATION CO., LTD., Guangdong (CN)

(72) Inventors: Guozhu Jiang, Guangdong (CN); Wei Li, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 252 days.

(21) Appl. No.: 17/975,123

(22) Filed: Oct. 27, 2022

(65) Prior Publication Data

US 2023/0052353 A1 Feb. 16, 2023

Related U.S. Application Data

(63) Continuation of application No. PCT/CN2021/089895, filed on Apr. 26, 2021.

(30) Foreign Application Priority Data

Apr. 29, 2020 (CN) ......................... 202010359556.5

(51) Int. Cl.
*H04R 1/24* (2006.01)
*H04R 1/02* (2006.01)
(Continued)

(52) U.S. Cl.
CPC ............... *H04R 1/24* (2013.01); *H04R 1/028* (2013.01); *H04R 1/345* (2013.01); *H04R 7/127* (2013.01);
(Continued)

(58) Field of Classification Search
CPC .......... H04R 1/24; H04R 1/028; H04R 1/345; H04R 7/127; H04R 9/06; H04R 9/045
(Continued)

(56) References Cited

U.S. PATENT DOCUMENTS

2013/0201316 A1* 8/2013 Binder ..................... G07C 3/02
701/2
2017/0085981 A1 3/2017 Mathur
(Continued)

FOREIGN PATENT DOCUMENTS

CN 204859514 U 12/2015
CN 205793303 U 12/2016
(Continued)

OTHER PUBLICATIONS

International Search Report and Written Opinion for PCT/CN2021/089895 issued on Jul. 22, 2021, 8 pages.

*Primary Examiner* — Thjuan K Addy
(74) *Attorney, Agent, or Firm* — Armstrong Teasdale LLP

(57) ABSTRACT

A loudspeaker includes a support, a magnetic assembly, a first vibration assembly, and a second vibration assembly. The first vibration assembly and the second vibration assembly are respectively arranged on a first side and a second side opposite to the first side of the support; the first vibration assembly includes a first voice coil and a first vibration diaphragm, the second vibration assembly includes a second voice coil and a second vibration diaphragm, the first vibration diaphragm and the second vibration diaphragm are both connected to the support; and the support is provided with an accommodating space for arranging the magnetic assembly, a magnetic gap is formed between the magnetic assembly and the support, the first voice coil and the second voice coil are both at least partially located in the magnetic gap, the first vibration assembly and the second vibration assembly emit ultrasonic waves having different frequencies.

20 Claims, 2 Drawing Sheets

(51) Int. Cl.
*H04R 1/34* (2006.01)
*H04R 7/12* (2006.01)
*H04R 7/18* (2006.01)
*H04R 9/02* (2006.01)
*H04R 9/04* (2006.01)
*H04R 9/06* (2006.01)

(52) U.S. Cl.
CPC ............... *H04R 7/18* (2013.01); *H04R 9/025* (2013.01); *H04R 9/045* (2013.01); *H04R 9/06* (2013.01); *H04R 2499/11* (2013.01)

(58) Field of Classification Search
USPC ..................................... 381/335, 87, 89, 332
See application file for complete search history.

(56) References Cited

U.S. PATENT DOCUMENTS

| | | | | |
|---|---|---|---|---|
| 2017/0171664 | A1 | 6/2017 | Shao et al. | |
| 2021/0175869 | A1* | 6/2021 | Taipale | H03F 3/50 |

FOREIGN PATENT DOCUMENTS

| | | | |
|---|---|---|---|
| CN | 107925811 | A | 4/2018 |
| CN | 108882089 | A | 11/2018 |
| CN | 109640229 | A | 4/2019 |
| CN | 110996229 | A | 4/2020 |

* cited by examiner

LOUDSPEAKER AND ELECTRONIC DEVICE

CROSS-REFERENCE TO RELATED APPLICATIONS

The application is a continuation of International Application No. PCT/CN2021/089895, filed on Apr. 26, 2021, which claims priority to Chinese Patent Application No. 202010359556.5, entitled "LOUDSPEAKER AND ELECTRONIC DEVICE" and filed on Apr. 29, 2020, which is incorporated by reference in its entirety.

TECHNICAL FIELD

The present disclosure relates to the field of communication device technologies, and in particular, to a loudspeaker and an electronic device.

BACKGROUND

With the rapid development of electronic devices, the electronic devices are increasingly widely applied, and the electronic devices such as mobile phones and tablet computers are playing more roles in people's work, lives, and entertainment. At present, a loudspeaker and a receiver of an electronic device amplify an audio signal and then push air through a sound film to emit sound. A frequency range of an audible sound of a human ear is 20 Hz-20 kHz. A sound wave of an audible sound does not have obvious directivity in the air, causing the sound to propagate in all directions around, which further causes the sound to be heard by more people. When people use the electronic device to play music, watch a video, or video chat, other people are easily affected. Currently, a main solution is to wear headphones. However, wearing headphones for a long time may cause problems such as discomfort and otitis media, and the headphones may be forgotten when people go out. Therefore, there is a desire for a sound production manner that can directionally project a sound to a designated position without affecting a surrounding environment.

In view of the above problems, an audio directional technology is currently used to directionally project the sound to the designated position without affecting the surrounding environment. The audio directional technology refers to application of a nonlinear acoustic theory to achieve directional propagation of the sound. The high directivity of an ultrasonic wave and nonlinear demodulation of air are used to demodulate two ultrasonic waves propagating in the same direction in the air, to obtain a difference frequency wave. The difference frequency wave is audible to the human ear, and the difference frequency wave is highly directional, so that the sound propagates to the designated area, and cannot be heard in other areas.

At present, the loudspeaker generally needs to produce ultrasonic waves of two frequencies simultaneously, so that the ultrasonic waves are demodulated into audible sound waves by the difference frequency at a far end. However, when the loudspeaker emits ultrasonic waves of two frequencies simultaneously, vibration diaphragms of the loudspeaker need to vibrate simultaneously to produce ultrasonic waves of the two frequencies, causing an obvious intermodulation distortion of the ultrasonic waves of the two frequencies, and causing a high distortion of the loudspeaker.

SUMMARY

According to a first aspect of the present disclosure, a loudspeaker is provided, which includes a support, a magnetic assembly, a first vibration assembly, and a second vibration assembly. The first vibration assembly is arranged on a first side of the support, and the second vibration assembly is arranged on a second side of the support, the first side and the second side being opposite to each other; the first vibration assembly includes a first voice coil and a first vibration diaphragm, and the second vibration assembly includes a second voice coil and a second vibration diaphragm, the first vibration diaphragm and the second vibration diaphragm being both connected to the support; and the support is provided with an accommodating space, the magnetic assembly is arranged in the accommodating space, a magnetic gap is formed between the magnetic assembly and the support, the first voice coil and the second voice coil are both at least partially located in the magnetic gap, the first vibration assembly emits a first ultrasonic wave, and the second vibration assembly emits a second ultrasonic wave, frequencies of the first ultrasonic wave and the second ultrasonic wave being not equal.

According to a second aspect of the present disclosure, an electronic device is provided, which includes a device body and the loudspeaker. The device body is provided with an inner cavity and a sound outlet hole, the sound outlet hole is in communication with the inner cavity, and the loudspeaker is arranged in the inner cavity.

BRIEF DESCRIPTION OF THE DRAWINGS

To describe the technical solutions of the embodiments of the present disclosure or the background art more clearly, the following briefly introduces the accompanying drawings required for describing the embodiments or the background art. Apparently, a person of ordinary skill in the art may still derive other drawings from these accompanying drawings without creative efforts.

DESCRIPTION OF REFERENCE NUMERALS OF THE ACCOMPANYING DRAWINGS

100—Support, 110—Accommodating space;
200—Magnetic assembly, 210—First magnetic member, 220—First magnetic conductive member, 230—Second magnetic member, 240—Second magnetic conductive member;
300—First vibration assembly, 310—First voice coil, 320—First vibration diaphragm, 330—First dome;
400—Second vibration assembly, 410—Second voice coil, 420—Second vibration diaphragm, 430—Second dome;
500—Magnetic gap;
600—First non-magnetic conductive support member;
700—Second non-magnetic conductive support member;
800—Device body, 810—Inner cavity, 820—Sound outlet hole;
900—Foam.

DETAILED DESCRIPTION

To make the objectives, technical solutions, and advantages of the present disclosure clearer, the technical solutions of the present disclosure will be clearly described below with reference to specific embodiments of the present disclosure and the accompanying drawings. Apparently, the described embodiments are some embodiments rather than all the embodiments of the present disclosure. All other embodiments obtained by a person of ordinary skill in the art based on the embodiments of the present disclosure without creative efforts shall fall within the protection scope of the present disclosure.

The following describes the technical solutions provided in the embodiments of the present disclosure in detail with reference to the accompanying drawings.

Figure 1:
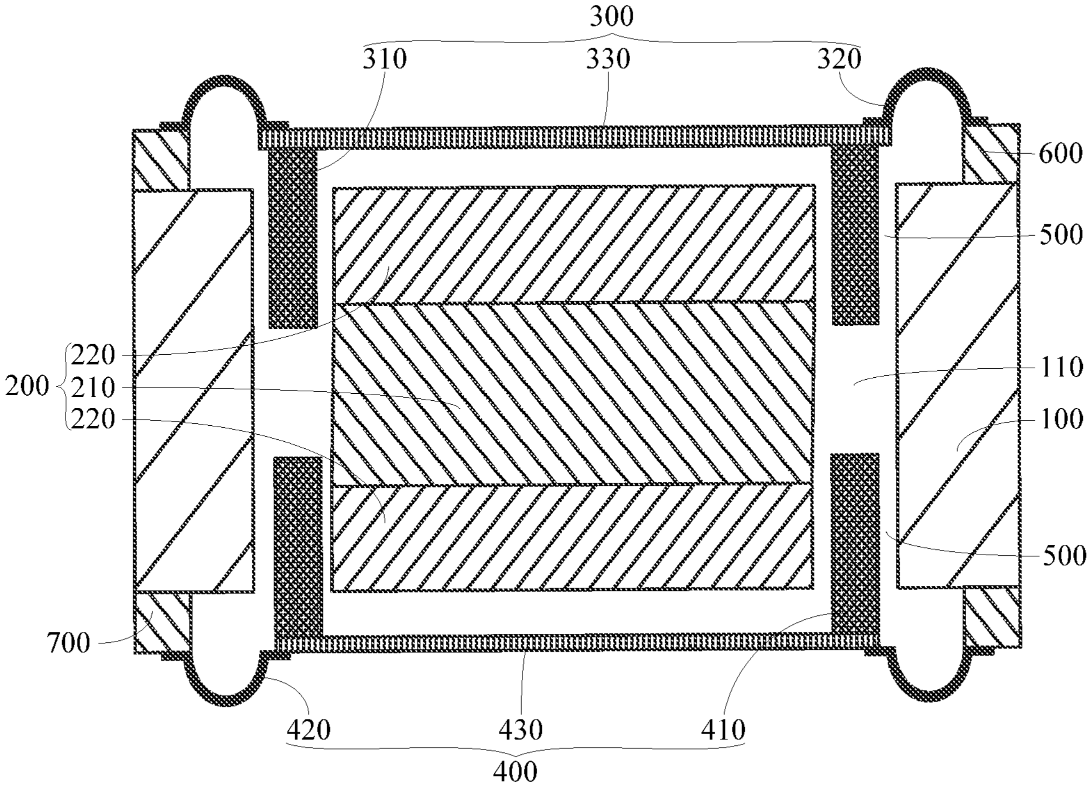
FIG. 1 is a schematic diagram of a loudspeaker according to an embodiment of the present disclosure.
Figure 2:
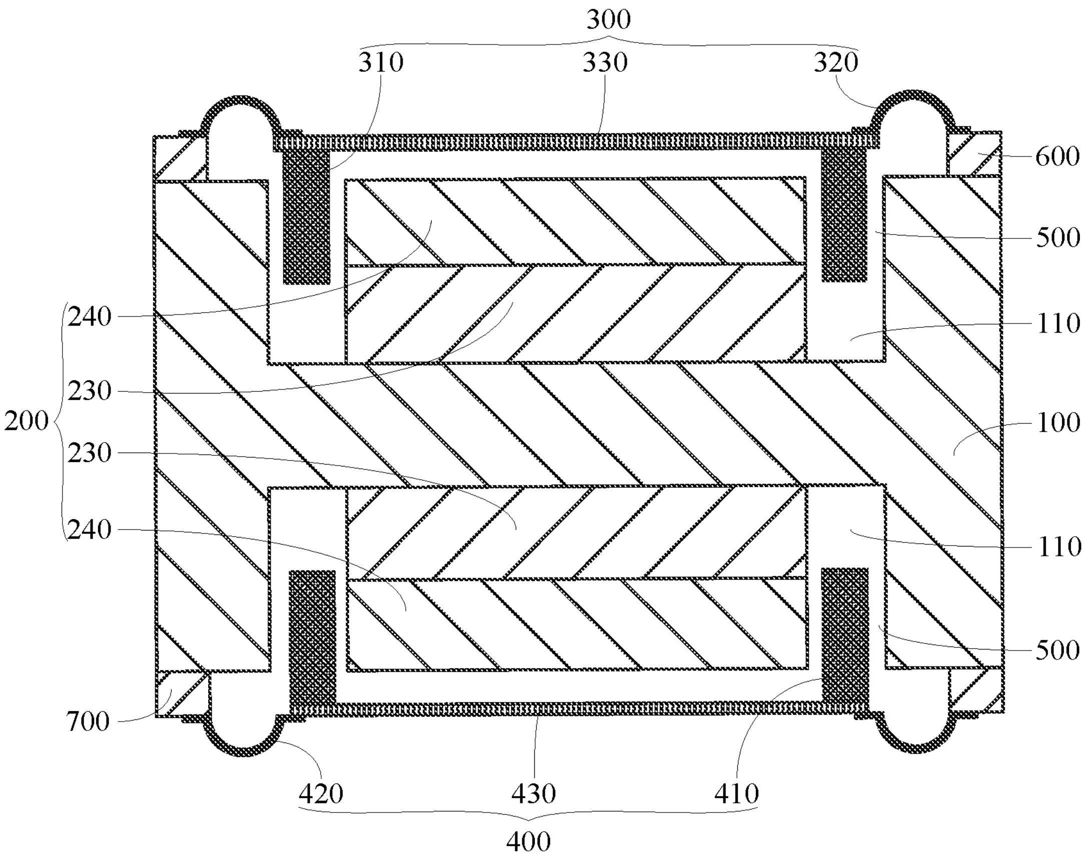
FIG. 2 is a schematic diagram of a loudspeaker according to another embodiment of the present disclosure.
Figure 3:
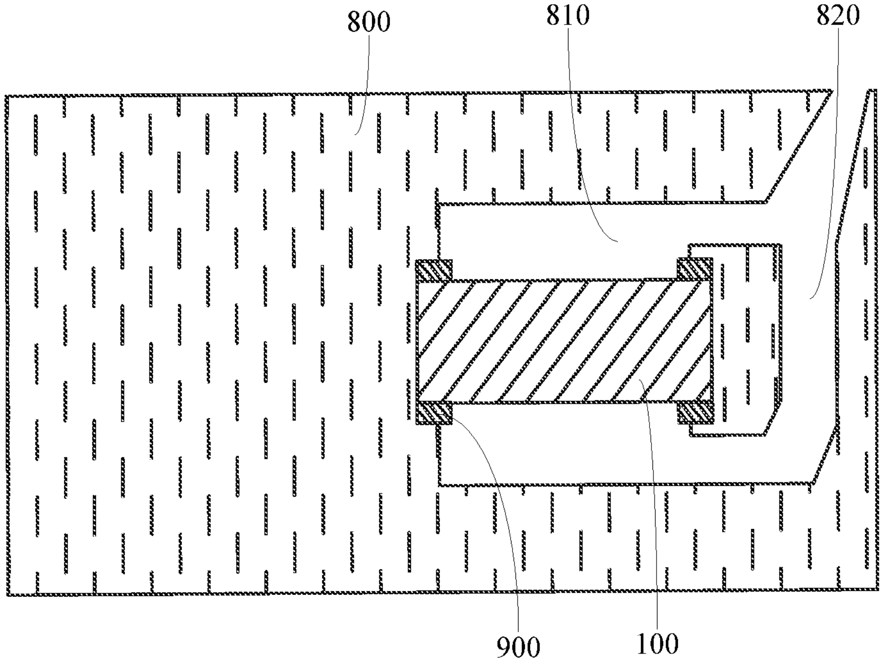
FIG. 3 is a schematic diagram of an electronic device according to an embodiment of the present disclosure.

Referring to FIG. 1 to FIG. 3, an embodiment of the present disclosure discloses a loudspeaker, and the disclosed loudspeaker includes a support 100, a magnetic assembly 200, a first vibration assembly 300, and a second vibration assembly 400.

The support 100 is a basic component of the loudspeaker, and the support 100 can provide a mounting basis for other components of the loudspeaker. In this embodiment of the present disclosure, the support 100 has a first side and a second side opposite to each other, and the support 100 is provided with an accommodating space 110.

The magnetic assembly 200 is arranged in the accommodating space 110, and a magnetic gap 500 is formed between the magnetic assembly 200 and the support 100. Magnetic lines of force exist in the magnetic gap 500, that is, a magnetic field exists in the magnetic gap 500.

The first vibration assembly 300 is arranged on the first side of the support 100, the second vibration assembly 400 is arranged on the second side of the support 100, the first vibration assembly 300 includes a first voice coil 310 and a first vibration diaphragm 320, the second vibration assembly 400 includes a second voice coil 410 and a second vibration diaphragm 420, the first vibration diaphragm 320 and the second vibration diaphragm 420 are both connected to the support 100, the first voice coil 310 and the second voice coil 410 are both at least partially located in the magnetic gap 500, and the first vibration assembly 300 and the second vibration assembly 400 are sound production components of the loudspeaker.

Alternatively, in a case that the first voice coil 310 and the second voice coil 410 are energized, an energized wire is subjected to an ampere force in the magnetic field, and therefore at least part of the first voice coil 310 and at least part of the second voice coil 410 in the magnetic gap 500 are subjected to the ampere force to produce a displacement. A magnitude and a direction of a current in the first voice coil 310 and the second voice coil 410 can be adjusted to control a displacement amplitude and a displacement direction of the first voice coil 310 and the second voice coil 410, so that the first vibration assembly 300 and the second vibration assembly 400 emit a sound wave through vibration. The first vibration assembly 300 may emit a first ultrasonic wave, and the second vibration assembly 400 may emit a second ultrasonic wave. A frequency of the first ultrasonic wave is not equal to a frequency of the second ultrasonic wave, the first ultrasonic wave and the second ultrasonic wave may be demodulated into audible sound waves through nonlinear demodulation of air when propagating in the air, and the audible sound waves can be recognized by the human ear.

In this embodiment of the present disclosure, the loudspeaker may emit two ultrasonic waves, and the high directivity of the ultrasonic waves enables the two ultrasonic waves to directionally propagate in the air. In addition, the nonlinear demodulation of the air enables the two ultrasonic waves to be demodulated into a plurality of sound waves. Frequencies of the two ultrasonic waves emitted by the loudspeaker are properly selected, so that difference frequency sound waves of the two ultrasonic waves may be audible sound waves. For example, the loudspeaker emits two ultrasonic waves with a frequency f1 and a frequency f2, which are affected by a nonlinear interaction of the air, the two ultrasonic waves with the frequency f1 and the frequency f2 are demodulated into a plurality of sound waves such as f1, f2, f1+f2, f1−f2, 2f1, and 2f2, where f1−f2 is the difference frequency sound wave. Proper selection of the frequencies of f1 and f2 enables f1−f2 to be the audible sound wave. For example, f1=41 kHz, f2=40 kHz, f1−f2=1 kHz, a sound wave with the frequency of 1 kHz is the audible sound wave, and the difference frequency sound wave of the two ultrasonic waves after the nonlinear demodulation of the air is still highly directional, so that the difference frequency sound wave can propagate directionally in the air, which enables directional propagation of a sound. The principles of ultrasonic directional propagation are known technologies, and details are not repeated herein for the brevity of the text.

In a specific work process, when a user needs to communicate privately or to avoid affecting a surrounding environment, the user may control the first voice coil 310 and the second voice coil 410 to connect to electrical signals respectively by manipulating a button or voice control. A combined effect of the magnetic field in the magnetic gap 500 and the electrical signals on the first voice coil 310 and the second voice coil 410 causes the first vibration assembly 300 and the second vibration assembly 400 to emit two ultrasonic waves through vibration. The two ultrasonic waves are demodulated into audible sound waves in the air, and directionally propagate to a listening object, so that the sound emitted by the loudspeaker does not propagate to the surrounding environment, to avoid affecting the surrounding environment or being heard by other people, thereby improving communication privacy of the user and protecting the privacy of the user.

In the loudspeaker disclosed in this embodiment of the present disclosure, the first vibration assembly 300 is arranged on the first side of the support 100, the second vibration assembly 400 is arranged on the second side of the support 100, the first vibration assembly 300 includes the first voice coil 310 and the first vibration diaphragm 320, the second vibration assembly 400 includes the second voice coil 410 and the second vibration diaphragm 420, the first vibration diaphragm 320 and the second vibration diaphragm 420 are both connected to the support 100, and the first voice coil 310 and the second voice coil 410 are both at least partially located in the magnetic gap 500. The first vibration assembly 300 and the second vibration assembly 400 are independent of each other, and the two vibration assemblies produce two ultrasonic waves respectively. Each vibration assembly works independently, and produces an ultrasonic wave respectively, avoiding a need for the same vibration assembly to vibrate simultaneously to produce two ultrasonic waves, which prevents the loudspeaker from generating an obvious intermodulation distortion when the two ultrasonic waves are emitted, thereby reducing the distortion of the loudspeaker.

In addition, resonant frequencies of the first vibration assembly 300 and the second vibration assembly 400 may be different, so that the resonant frequency of the first vibration assembly 300 is closer to the frequency of the first ultrasonic wave, and the resonant frequency of the second vibration assembly 400 is closer to the frequency of a second ultrasonic wave. An excitation electrical signal with a same or similar resonant frequency as the first vibration assembly

300 is applied to the first voice coil 310, and an excitation electrical signal with a same or similar resonant frequency as the second vibration assembly 400 is applied to the second voice coil 410, to make the first vibration assembly 300 emit the first ultrasonic wave at a resonant frequency position with the highest electro-acoustic conversion efficiency, and make the second vibration assembly 400 emit the second ultrasonic wave at a resonant frequency position with the highest electro-acoustic conversion efficiency, so that the energy efficiency of the loudspeaker is higher.

In an optional embodiment, quantities of the accommodating spaces 110 and the magnetic assemblies 200 may be both one, the accommodating space 110 runs through the support 100, and the magnetic gap 500 is formed between the magnetic assembly 200 and an inner wall of the accommodating space 110. Referring to FIG. 1 again, the first vibration assembly 300 and the second vibration assembly 400 may share the same magnetic assembly 200, reducing the quantity of the magnetic assemblies 200, thereby reducing the cost of the loudspeaker. In addition, one magnetic assembly 200 occupies less space in the loudspeaker, so that the loudspeaker can be made small, a volume of the loudspeaker is small, and a current demand of the user for a thin electronic device is met.

Alternatively, the magnetic assembly 200 may include a first magnetic member 210 and two first magnetic conductive members 220, the two first magnetic conductive members 220 are respectively arranged on opposite sides of the first magnetic member 210, and the two first magnetic conductive members 220 are respectively arranged opposite to the first vibration assembly 300 and the second vibration assembly 400. The cost of the magnetic conductive member is usually lower than the cost of the magnetic member. Therefore, in this embodiment, on the condition that the magnetic gap 500 is formed between the magnetic assembly 200 and the inner wall of the accommodating space 110, the two first magnetic conductive members 220 are used to replace part of the first magnetic members 210, to make a smaller size of the first magnetic member 210, thereby reducing the cost. The magnetic gap 500 with a stronger magnetic field can be well formed between the first magnetic conductive member 220 and the inner wall of the accommodating space 110, avoiding affecting normal operation of the loudspeaker. The first magnetic conductive member 220 may be of a plurality of types, such as an iron member and a silicon steel sheet. The type of the first magnetic conductive member 220 is not limited in this embodiment of the present disclosure.

As mentioned above, the quantities of the accommodating spaces 110 and the magnetic assemblies 200 may be both one. Certainly, the quantities of the accommodating spaces 110 and the magnetic assemblies 200 may be both two. The two accommodating spaces 110 are respectively provided on the first side and the second side, the two magnetic assemblies 200 are arranged in the two accommodating spaces 110 in a one-to-one correspondence, and the magnetic gap 500 is formed between the two magnetic assemblies 200 and inner walls of the two accommodating spaces 110 in a one-to-one correspondence. In this embodiment, the support 100 is not penetrated, and therefore the strength of the support 100 can be improved, so that the strength of the support 100 is higher, thereby improving the reliability of the support 100 and finally improving the reliability of the loudspeaker.

Alternatively, the magnetic assembly 200 includes a second magnetic member 230 and a second magnetic conductive member 240, and the second magnetic conductive member 240 is arranged on one side of the second magnetic member 230, and is opposite to the first vibration assembly 300 or the second vibration assembly 400. On the condition that the magnetic gap 500 is formed between the two magnetic assemblies 200 and the inner walls of the two accommodating spaces 110 respectively, the second magnetic conductive member 240 is used to replace part of the second magnetic member 230, to make a smaller size of the second magnetic member 230, thereby reducing the cost. The magnetic gap 500 can be well formed between the second magnetic conductive member 240 and the inner wall of the accommodating space 110, avoiding affecting normal operation of the loudspeaker. The second magnetic conductive member 240 may be of a plurality of types, such as an iron member and a silicon steel sheet. The type of the second magnetic conductive member 240 is not limited in this embodiment of the present disclosure.

As mentioned above, the magnetic lines of force exist in the magnetic gap 500. To make the magnetic lines of force in the magnetic gap 500 densely distributed to improve the magnetic field in the magnetic gap 500, in an optional embodiment, opposite ends of the two magnetic assemblies 200 may have the same polarity. This arrangement manner can increase the magnetic induction density in the magnetic gap 500, so that the magnetic field in the magnetic gap 500 is stronger. In a case that the first voice coil 310 and the second voice coil 410 are energized, the first voice coil 310 and the second voice coil 410 in the magnetic gap 500 with the stronger magnetic field are subjected to a larger ampere force, so that the vibration of the first vibration assembly 300 and the second vibration assembly 400 is stronger. In addition, when the first vibration assembly 300 and the second vibration assembly 400 vibrate with the same amplitude, the current in the first voice coil 310 and the second voice coil 410 may be smaller, so that the power consumption of the loudspeaker is lower.

To further improve the magnetic induction density in the magnetic gap 500, optionally, the support 100 may be a magnetic conductive support, and the magnetic conductive support is magnetic under the effect of the magnetic assembly 200, so that the magnetic gap 500 with the higher magnetic induction density can be formed between the magnetic conductive support and the magnetic assembly 200, further improving the magnetic induction density in the magnetic gap 500.

In this embodiment of the present disclosure, the first vibration assembly 300 and the second vibration assembly 400 are sound production components of the loudspeaker, the first vibration assembly 300 may emit the first ultrasonic wave, and the second vibration assembly 400 may emit the second ultrasonic wave. Alternatively, the first vibration assembly 300 may further include a first dome 330, the first voice coil 310 is connected to the first dome 330, the first vibration diaphragm 320 is connected to an edge of the first dome 330, and the first vibration diaphragm 320 is connected to the support 100. The first vibration assembly 300 with this structure has a simple structure and is convenient to arrange, and the first vibration assembly 300 has a better sound production effect.

The second vibration assembly 400 may further include a second dome 430, the second voice coil 410 is connected to the second dome 430, the second vibration diaphragm 420 is connected to an edge of the second dome 430, and the second vibration diaphragm 420 is connected to the support 100. The second vibration assembly 400 with this structure has a simple structure and is convenient to arrange, and the second vibration assembly 400 has a better sound production effect. Alternatively, material and shape of the first vibration diaphragm 320 and the second vibration diaphragm 420, weight of the first dome 330 and the second dome 430, and weight of the first voice coil 310 and the second voice coil 410 can be adjusted, to adjust the resonant frequencies of the first vibration assembly 300 and the second vibration assembly 400. In addition, the loudspeaker needs to emit an ultrasonic wave, and therefore the material hardness of the first vibration diaphragm 320 and the second vibration diaphragm 420 is required to be high, the weight of the first dome 330 and the second dome 430 and the weight of the first voice coil 310 and the second voice coil 410 are required to be light.

In a case that the support 100 is a magnetic conductive support, the first vibration diaphragm 320 and the second vibration diaphragm 420 connected to the support 100 are affected by a magnetic force of the support 100, which makes it difficult for the first vibration assembly 300 and the second vibration assembly 400 to perform better vibration, and may distort the sound emitted by the first vibration assembly 300 and the second vibration assembly 400. Based on this, in an optional embodiment, the loudspeaker may further include a first non-magnetic conductive support member 600 and a second non-magnetic conductive support member 700, the first non-magnetic conductive support member 600 is arranged on the first side, the first vibration diaphragm 320 is connected to the first non-magnetic conductive support member 600, the second non-magnetic conductive support member 700 is arranged on the second side, and the second vibration diaphragm 420 is connected to the second non-magnetic conductive support member 700. In the case that the support 100 is a magnetic conductive support, the first non-magnetic conductive support member 600 and the second non-magnetic conductive support member 700 can prevent the first vibration diaphragm 320 and the second vibration diaphragm 420 from being affected by the magnetic force of the support 100, so that the first vibration assembly 300 and the second vibration assembly 400 can be independent and not affected by the magnetic force of the support 100 during vibration. Therefore, the vibration effect of the first vibration assembly 300 and the second vibration assembly 400 is better, and distortion of the sound emitted by the first vibration assembly 300 and the second vibration assembly 400 is avoided.

Based on the loudspeaker disclosed in this embodiment of the present disclosure, an embodiment of the present disclosure further discloses an electronic device. The disclosed electronic device includes a device body 800 and the loudspeaker described in any of the above embodiments. The device body 800 is provided with an inner cavity 810 and a sound outlet hole 820, the sound outlet hole 820 is in communication with the inner cavity 810, and the loudspeaker is arranged in the inner cavity 810. In the electronic device disclosed in this embodiment of the present disclosure, ultrasonic waves emitted by the loudspeaker can propagate to the outside of the electronic device through the sound outlet hole 820, so that a sound of the electronic device can propagate directionally. An orientation of the sound outlet hole 820 can be adjusted, so that the sound of the electronic device can directionally propagate to a listening object, the sound emitted by the electronic device can directionally propagate to a position of the listening object, and the sound does not propagate to a surrounding environment, avoiding affecting the surrounding environment or being heard by other people, thereby improving communication privacy of a user and protecting the privacy of the user.

It should be noted that, the listening object may be the user of the electronic device, or may be a recipient of the sound designated by the user of the electronic device. For example, the user of the electronic device shares the sound with other people.

Alternatively, the loudspeaker may divide the inner cavity 810 into a first inner cavity and a second inner cavity, the first vibration assembly 300 faces the first inner cavity, and the second vibration assembly 400 faces the second inner cavity. The device body 800 is provided with a first sound guide channel and a second sound guide channel, the sound outlet hole 820 is in communication with the first inner cavity through the first sound guide channel, and the sound outlet hole 820 is in communication with the second inner cavity through the second sound guide channel, to make two ultrasonic waves propagate away through one sound outlet hole 820, and therefore the sound propagation directivity can be stronger.

In an optional embodiment, a side wall of the inner cavity 810 may be provided with a mounting groove, the loudspeaker may be arranged in the mounting groove, and the loudspeaker is connected to a side wall of the mounting groove through foam 900. This arrangement manner is more simple and convenient to arrange. In addition, when the electronic device is subjected to a shock or when the electronic device vibrates, the foam 900 can buffer the loudspeaker, and prevent the loudspeaker from being damaged due to the shock or vibration of the electronic device, thereby improving the reliability of the electronic device.

The sound outlet hole 820 may be provided on the electronic device by post-processing. However, this method destroys the integrity of the electronic device, causing a low aesthetic appearance of the electronic device. Optionally, the device body 800 may include a first functional assembly and a second functional assembly. The first functional assembly is mounted on the second functional assembly. An assembly gap is formed between the first functional assembly and the second functional assembly, and the assembly gap forms the sound outlet hole 820. In a process of assembling an electronic device, an assembly gap is usually provided, and the assembly gap is used to replace the sound outlet hole 820 provided on the electronic device by post-processing, to avoid providing a hole on the electronic device. This manner does not destroy the integrity of the electronic device, and the aesthetic appearance of the electronic device is improved, so that a better user experience is provided.

Alternatively, in a case that the electronic device is a mobile phone, the first functional assembly may be a housing, the second functional assembly may be a battery cover, the second functional assembly may also be a button, and an assembly gap is usually formed between the button and the housing. The manner of forming the assembly gap is not limited in this embodiment of the present disclosure.

Further, there may be a plurality of sound outlet holes 820, and the plurality of sound outlet holes 820 are all in communication with the inner cavity 810. The plurality of sound outlet holes 820 can make more ultrasonic waves propagate to the outside of the electronic device, so that the sound production effect of the electronic device is better, thereby improving the user experience of the electronic device.

The electronic device disclosed in this embodiment of the present disclosure may be a device such as a smartphone, a tablet computer, an e-book reader, smart glasses (such as a smart watch), and a video game machine. The specific type of electronic device is not limited in this embodiment of the present disclosure.

The above embodiments of the present disclosure focus on describing the differences between the embodiments. As long as the different optimization features between the embodiments are not contradictory, the embodiments can be combined to form a better embodiment, and details are not repeated herein for the brevity of the text.

The foregoing descriptions are merely embodiments of the present disclosure and are not intended to limit the present disclosure. For a person of ordinary skill in the art, various modifications and variations of the present disclosure are possible. Any modification, equivalent replacement, or improvement made without departing from the spirit and principle of the present disclosure shall fall within the scope of claims of the present disclosure.

What is claimed is:

1. A loudspeaker, comprising a support, a magnetic assembly, a first vibration assembly, and a second vibration assembly, wherein the first vibration assembly is arranged on a first side of the support, and the second vibration assembly is arranged on a second side of the support, the first side and the second side being opposite to each other, the first vibration assembly comprises a first voice coil and a first vibration diaphragm, and the second vibration assembly comprises a second voice coil and a second vibration diaphragm, the first vibration diaphragm and the second vibration diaphragm being both connected to the support; and the support is provided with an accommodating space, the magnetic assembly is arranged in the accommodating space, a magnetic gap is formed between the magnetic assembly and the support, the first voice coil and the second voice coilare both at least partially located in the magnetic gap, the first vibration assembly emits a first ultrasonic wave, and the second vibration assembly emits a second ultrasonic wave, and frequencies of the first ultrasonic wave and the second ultrasonic wave being unequal.

2. The loudspeaker according to claim 1, wherein quantities of the accommodating spaces and the magnetic assemblies are both one, the accommodating space runs through the support, and the magnetic gap is formed between the magnetic assembly and an inner wall of the accommodating space.

3. The loudspeaker according to claim 2, wherein the magnetic assembly comprises a first magnetic member and two first magnetic conductive members, the two first magnetic conductive members are respectively arranged on opposite sides of the first magnetic member, and the two first magnetic conductive members are respectively arranged opposite to the first vibration assembly and the second vibration assembly.

4. The loudspeaker according to claim 1, wherein quantities of the accommodating spaces and the magnetic assemblies are both two, the two accommodating spaces are respectively provided on the first side and the second side, the two magnetic assemblies are arranged in the two accommodating spaces in a one-to-one correspondence, and the magnetic gap is formed between the two magnetic assemblies and inner walls of the two accommodating spaces in a one-to-one correspondence.

5. The loudspeaker according to claim 4, wherein the magnetic assembly comprises a second magnetic member and a second magnetic conductive member, and the second magnetic conductive member is arranged on one side of the second magnetic member, and is opposite to the first vibration assembly or the second vibration assembly.

6. The loudspeaker according to claim 4, wherein opposite ends of the two magnetic assemblies have the same polarity.

7. The loudspeaker according to claim 1, wherein the support is a magnetic conductive support.

8. The loudspeaker according to claim 1, wherein the first vibration assembly further comprises a first dome, the first voice coil is connected to the first dome, the first vibration diaphragm is connected to an edge of the first dome, and the first vibration diaphragm is connected to the support; and the second vibration assembly further comprises a second dome, the second voice coil is connected to the second dome, the second vibration diaphragm is connected to an edge of the second dome, and the second vibration diaphragm is connected to the support.

9. The loudspeaker according to claim 8, wherein the loudspeaker further comprises a first non-magnetic conductive support member and a second non-magnetic conductive support member, the first non-magnetic conductive support member is arranged on the first side, the first vibration diaphragm is connected to the first non-magnetic conductive support member, the second non-magnetic conductive support member is arranged on the second side, and the second vibration diaphragm is connected to the second non-magnetic conductive support member.

10. An electronic device, comprising a device body and a loudspeaker, wherein the device body is provided with an inner cavity and a sound outlet hole, the sound outlet hole is in communication with the inner cavity, and the loudspeaker is arranged in the inner cavity; the loudspeaker comprises a support, a magnetic assembly, a first vibration assembly, and a second vibration assembly, wherein the first vibration assembly is arranged on a first side of the support, and the second vibration assembly is arranged on a second side of the support, the first side and the second side being opposite to each other, the first vibration assembly comprises a first voice coil and a first vibration diaphragm, and the second vibration assembly comprises a second voice coil and a second vibration diaphragm, the first vibration diaphragm and the second vibration diaphragm being both connected to the support; and the support is provided with an accommodating space, the magnetic assembly is arranged in the accommodating space, a magnetic gap is formed between the magnetic assembly and the support, the first voice coil and the second voice coil are both at least partially located in the magnetic gap, the first vibration assembly emits a first ultrasonic wave, and the second vibration assembly emits a second ultrasonic wave, and frequencies of the first ultrasonic wave and the second ultrasonic wave being unequal.

11. The electronic device according to claim 10, wherein the loudspeaker divides the inner cavity into a first inner cavity and a second inner cavity, the first vibration assembly faces the first inner cavity, the second vibration assembly faces the second inner cavity, the device body is provided with a first sound guide channel and a second sound guide channel, the sound outlet hole is in communication with the first inner cavity through the first sound guide channel, and the sound outlet hole is in communication with the second inner cavity through the second sound guide channel.

12. The electronic device according to claim 10, wherein a side wall of the inner cavity is provided with a mounting groove, the loudspeaker is arranged in the mounting groove, and the loudspeaker is connected to a side wall of the mounting groove through foam.

13. The electronic device according to claim 10, wherein the device body comprises a first functional assembly and a second functional assembly, the first functional assembly is mounted on the second functional assembly, an assembly gap is formed between the first functional assembly and the second functional assembly, and the assembly gap forms the sound outlet hole.

14. The electronic device according to claim 10, wherein a quantity of the sound outlet hole is plural, and the plurality of sound outlet holes are all in communication with the inner cavity.

15. An electronic device, comprising a device body and the loudspeaker according to claim 2, wherein the device body is provided with an inner cavity and a sound outlet hole, the sound outlet hole is in communication with the inner cavity, and the loudspeaker is arranged in the inner cavity.

16. An electronic device, comprising a device body and the loudspeaker according to claim 3, wherein the device body is provided with an inner cavity and a sound outlet hole, the sound outlet hole is in communication with the inner cavity, and the loudspeaker is arranged in the inner cavity.

17. An electronic device, comprising a device body and the loudspeaker according to claim 4, wherein the device body is provided with an inner cavity and a sound outlet hole, the sound outlet hole is in communication with the inner cavity, and the loudspeaker is arranged in the inner cavity.

18. An electronic device, comprising a device body and the loudspeaker according to claim 5, wherein the device body is provided with an inner cavity and a sound outlet hole, the sound outlet hole is in communication with the inner cavity, and the loudspeaker is arranged in the inner cavity.

19. An electronic device, comprising a device body and the loudspeaker according to claim 8, wherein the device body is provided with an inner cavity and a sound outlet hole, the sound outlet hole is in communication with the inner cavity, and the loudspeaker is arranged in the inner cavity.

20. An electronic device, comprising a device body and the loudspeaker according to claim 9, wherein the device body is provided with an inner cavity and a sound outlet hole, the sound outlet hole is in communication with the inner cavity, and the loudspeaker is arranged in the inner cavity.

* * * * *